Nov. 1, 1955  E. M. THOLL  2,722,461
FISH HANDLING APPARATUS
Filed Aug. 14, 1952  2 Sheets-Sheet 1
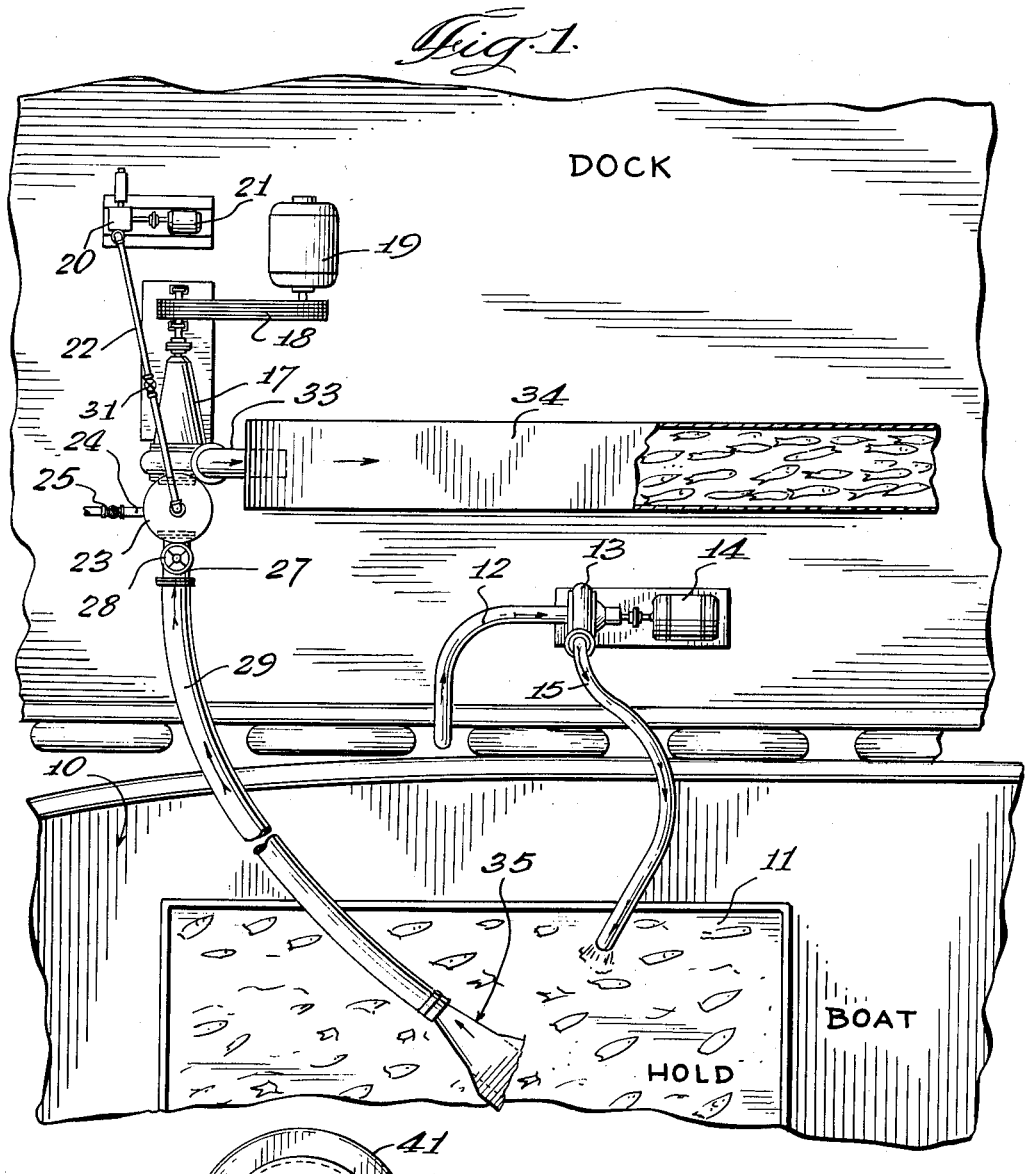
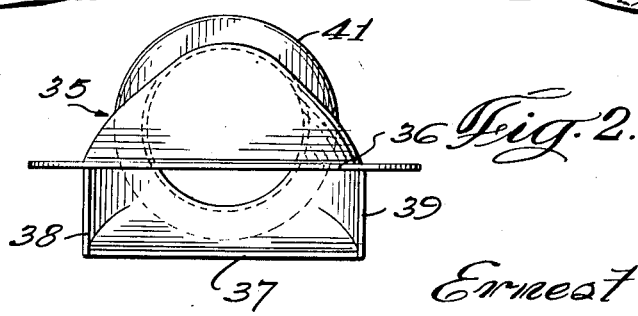
Inventor
Ernest M. Tholl
By Soans, Haister & Anderson
Attorneys

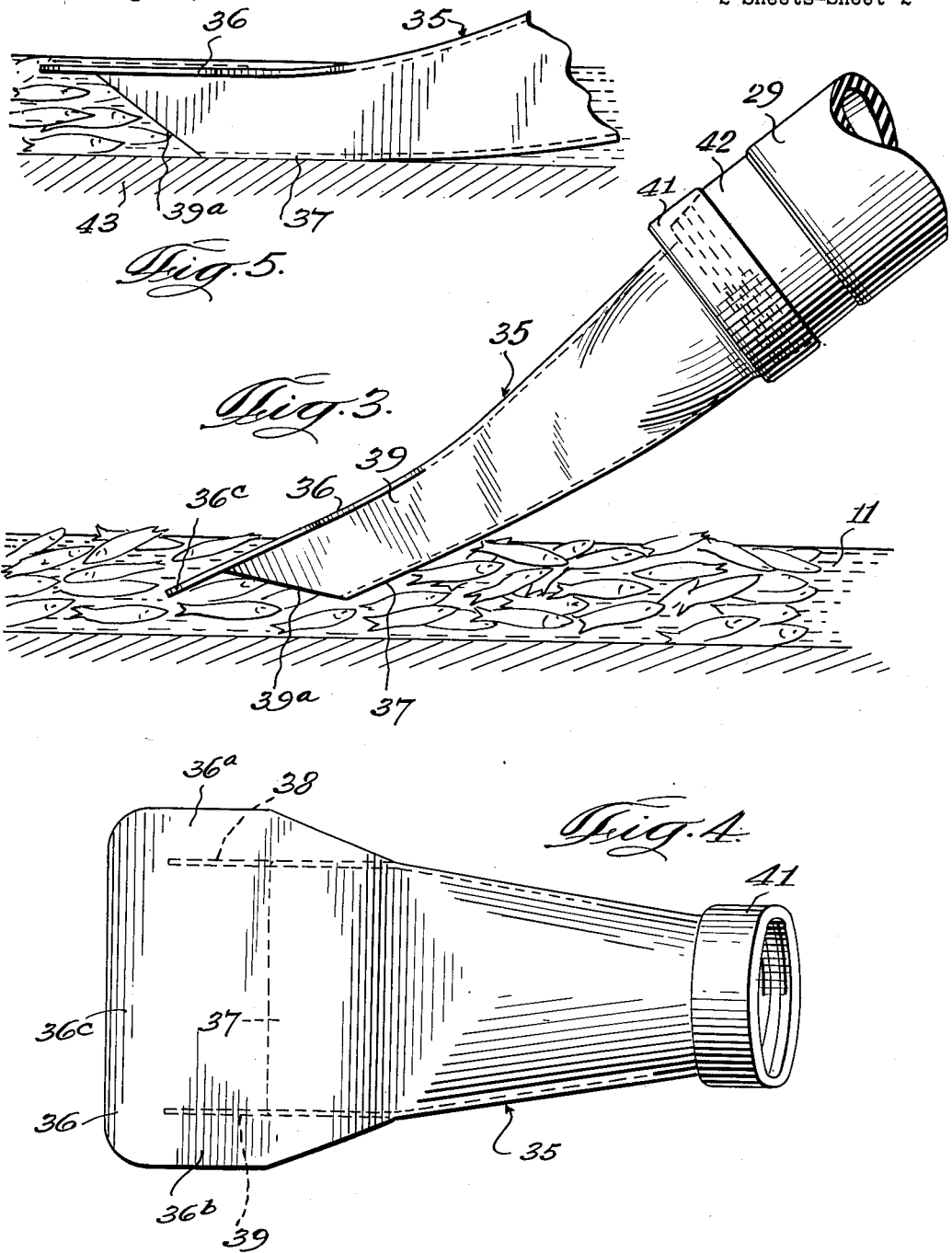

United States Patent Office 2,722,461
Patented Nov. 1, 1955

2,722,461

FISH HANDLING APPARATUS

Ernest M. Tholl, Chicago, Ill., assignor to Yeomans Brothers Company, Chicago, Ill., a corporation of Delaware Application August 14, 1952, Serial No. 304,285

2 Claims. (Cl. 302—14)

The present invention is concerned with a fish handling apparatus of the type employed to transfer fish from the sea into the holds of fishing ships and more commonly for the transfer of fish from the fishing vessels to dock installations.

One of the newer developments in the field of fish handling has been the development of a fish pump including a flexible suction line arranged to convey the fish from the hold of the fishing ship directly to a dock installation, such as a processing plant. While these installations decrease the time required for unloading the hold of a ship very substantially they nevertheless have the disadvantage that unless extreme care is used some of the fish are apt to be mutilated by the action of the fish pump to a degree where they will no longer meet the standards prescribed for a salable product. In addition, with the type of suction lines ordinarily employed in these installations, it is extremely difficult to drain the hold of the ship completely by means of the suction line alone.

To overcome these difficulties, the present invention provides an improved fish handling apparatus which includes a unique type of nozzle arrangement designed to overcome the previously encountered difficulties. The nozzle of the present invention is specifically designed to minimize or eliminate vortexing effects which occur, for example, at the inlet end of an ordinary flexible hose. Furthermore, the nozzle of the present invention is arranged to permit substantially complete drainage of the material contained in the hold and thereby insure more or less complete transfer of the fish to the dock installations.

An object of the present invention is to provide an improved fish handling apparatus including an improved nozzle assembly for minimizing or eliminating vortexing effects at the inlet.

Another object of the invention is to provide an improved nozzle assembly for fish handling apparatus which is capable of draining the hold of a fishing ship more completely than the ordinary suction line now conventionally employed in such installations.

Still another object of the present invention is to provide an improved nozzle assembly for fish pumps which may be readily attached to existing suction lines in similar installations.

A further description of the present invention will be made in conjunction with a description of the attached sheets of drawings in which:

Figure 1 is a fragmentary plan view of an installation for transferring fish from the hold of a ship to the dock;

Figure 2 is an end elevational view of the improved nozzle assembly of the present invention;

Figure 3 is a side elevational view of the nozzle assembly;

Figure 4 is a plan view of the nozzle assembly; and

Figure 5 is a fragmentary side elevational view illustrating the manner in which the nozzle rests upon the base of the hold in emptying the last few inches of water and fish contained in the hold.

In Figure 1, reference numeral 10 indicates generally a fishing ship provided with a hold 11 in which the catch is stored. The fish contained in the hold 11 are relatively closely packed and very little water is contained in the hold during the time the fish are transported to the dock. For pumping purposes, the amount of water contained in the hold is therefore usually insufficient, and an additional source of water should be supplied to the hold in order that the fish pumping system may operate efficiently. This additional source of water is provided by means of a conduit 12, one end of which is immersed in the water alongside the dock, while the other end communicates with the inlet of a pump 13 driven by a motor 14. An outlet conduit 15 delivers the water from the outlet end of the pump 13 into the hold 11 in sufficient quantities to insure proper flow through the fish pumping system.

The dock installation also includes a suction pump 17, driven by means of a belt 18 from a motor 19. For priming purposes, a vacuum pump 20 driven by a motor 21 is also provided, the vacuum pump 20 being associated with a vacuum line 22 communicating with a priming tank 23. An additional source of water is introduced into the priming tank 23 through a conduit 24 provided with a valve 25.

An inlet 27 to the suction pump assembly is controlled by a valve 28. A flexible hose 29 is coupled to the inlet 27, the hose 29 being provided with a nozzle 35.

In starting the suction pump 17, the inlet line 27 is closed by operation of the valve 28, and the valve 25 is opened, permitting water to flow into the priming tank. At this time a valve 31 in the conduit 22 is opened causing the vacuum pump 20 to partially evacuate the priming tank 23. The suction pump 17 is then started, and when the water level in the priming tank 23 reaches a predetermined point, the vacuum pump is shut off. The latter operation may be carried out automatically by providing a float valve in the priming tank 23 whose operation energizes and de-energizes the motor 21. When the vacuum pump has been shut off, the inlet valve 28 is opened permitting the stream of fish to enter the pump assembly and be discharged through a discharge line 33 into an inclined sluiceway 34.

The improved nozzle assembly associated with the flexible conduit 29 is illustrated in Figure 1 at reference numeral 35. The specific details of construction of the nozzle 35 are best illustrated in Figures 2 through 5 of the drawings. As seen in these figures, the nozzle 35 includes a top wall 36, a base wall 37 and side walls 38 and 39. At the inlet end, the nozzle has a generally rectangular cross section, while the outlet end of the nozzle is provided with an internally threaded fitting 41 which engages an externally threaded fitting 42 on the hose 29. As best seen in Figures 3 and 5, the nozzle 35 is curved upwardly from the inlet end to the outlet end except at the extremities of the inlet end where the top wall 36 and the base wall 37 are relatively flat. The walls 38 and 39 converge from the inlet end of the nozzle to the reduced diameter fitting 41. This configuration makes it possible for the base wall 37 to rest flatly against the base 43 of the hold (Figure 5). As a result, even the last few inches of water and the fish contained therein can be effectively drained from the hold with the nozzle in the position illustrated in Figure 5.

As best seen in Figure 4, the top wall 36 of the nozzle assembly extends longitudinally beyond the ends of the side walls 38 and 39 and also has laterally extending portions 36a and 36b which project laterally beyond the edges of the side walls 38 and 39 at the inlet end of the nozzle. The dimensions of the top wall 36 are quite important for securing the proper flow characteristics in the nozzle. I have found that for achieving the best flow characteristics, each of the laterally extending portions 36a and 36b should extend beyond the side walls 38 and 39 by at least 2 per cent of the distance between the opposed walls 38 and 39 at the inlet end of the nozzle. Preferably, the width of the projecting portion 36a and 36b are each about 25 per cent of the distance between the walls 38 and 39.

The edges of the side walls 38 and 39 are bevelled as indicated at 39a at the inlet end of the nozzle. The portion of the top wall 36 projecting beyond the side walls and the base thereby provides a lip 36c which has been found effective in reducing vortexing effects at the inlet to the nozzle. In the absence of this projecting lip, the water entering the nozzle exhibits a definite vortexing effect which not only reduces the rate at which the fish can be pumped, but also has a tendency to damage the fish in passage through the nozzle. The lip 36c also had a minimum length which should be observed for best efficiencies. From experience the lip 36c should extend beyond the ends of the side walls by at least about 10 per cent of the distance between the side walls 38 and 39 at the inlet end of the nozzle, and is preferably on the order of 25 per cent of this distance.

The use of the improved nozzle assembly of the present invention has been found to increase the efficiency of the pumping operation quite substantially. Not only is the pumping rate maintained at a higher level than that which has been previously employed with other types of suction lines, but the nozzle of the present invention has the further advantage because of its configuration that the hold of the ship can be drained substantially completely without leaving an appreciable residue which must be removed by hand operations.

While the invention has been described in connection with a preferred embodiment thereof, it will be recognized by those skilled in the art that various modifications can be made in the described assembly without departing from the scope of the present invention.

I claim:
1. In a pumping system including a pump and a flexible inlet line connected to the inlet of said pump, a nozzle connected to said inlet line, said nozzle including side walls, a top wall and a base defining an open ended inlet which is generally rectangular in cross-section, said top wall and base being relatively flat from the inlet of said nozzle to transverse lines intermediate the length of said nozzle and then curving upwardly, said top wall extending longitudinally beyond said side walls and said base and also having extensions extending laterally beyond said side walls.

2. In a fish pumping system including a pump and a flexible inlet line connected to the inlet of said pump, a nozzle connected to said inlet line, said nozzle including side walls, a top wall and a base defining an open ended inlet which is generally rectangular in cross section, said top wall and base being relatively flat from the inlet of said nozzle to transverse lines located intermediate the length of said nozzle and then curving upwardly, said top wall extending longitudinally beyond the ends of said side walls a distance at least equal to 10 per cent of the distance between said side walls at the inlet of said nozzle and also having extensions projecting laterally beyond said side walls for a distance at least equal to 2 per cent of the distance between the side walls at the inlet of said nozzle.

References Cited in the file of this patent
UNITED STATES PATENTS

| | | |
|---|---|---|
| 1,991,830 | Watson | Feb. 19, 1935 |
| 2,193,466 | Raymond | Mar. 12, 1940 |
| 2,396,305 | Toft | Mar. 12, 1946 |
| 2,533,697 | Stewart | Dec. 12, 1950 |